No. 875,049. PATENTED DEC. 31, 1907.
W. U. COLTHAR.
TRUCK FOR UNDERTAKERS' USE.
APPLICATION FILED MAY 31, 1906.
2 SHEETS—SHEET 1.
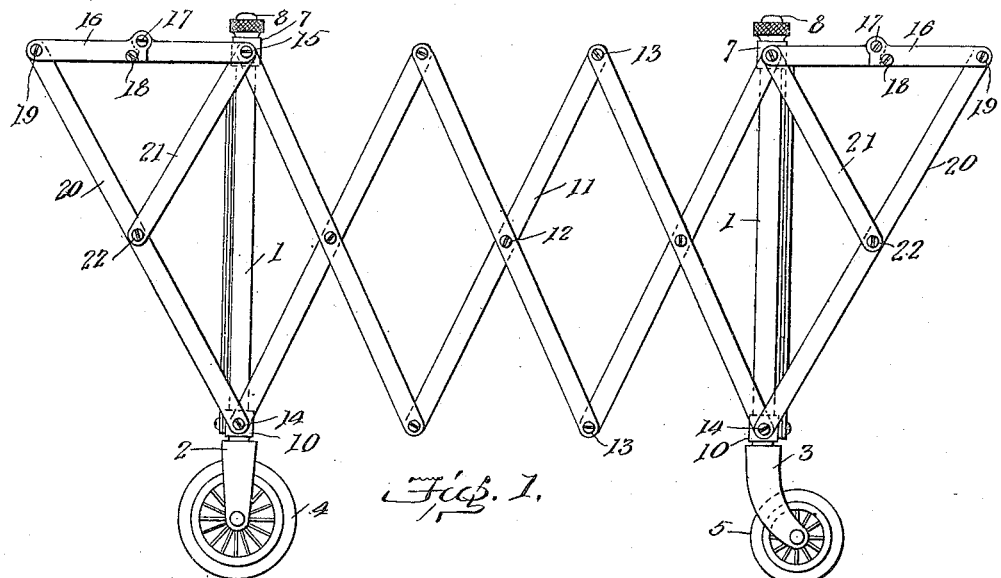
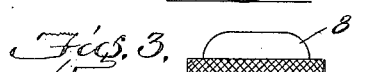
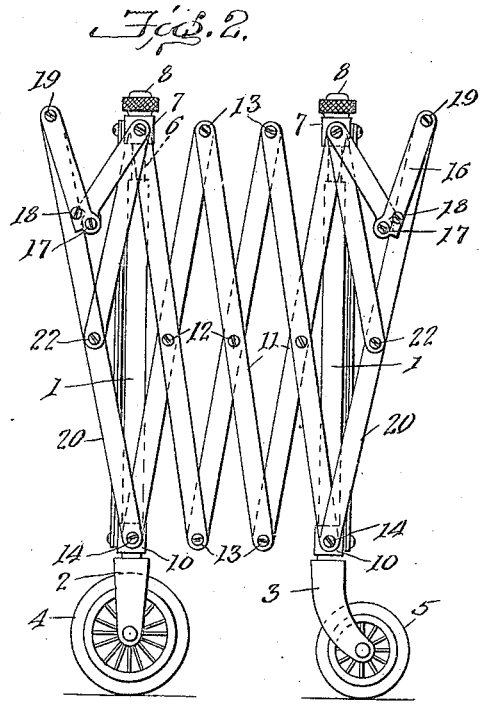
Inventor
William U. Colthar No. 875,049. PATENTED DEC. 31, 1907.
W. U. COLTHAR.
TRUCK FOR UNDERTAKERS' USE.
APPLICATION FILED MAY 31, 1906.
2 SHEETS—SHEET 2.
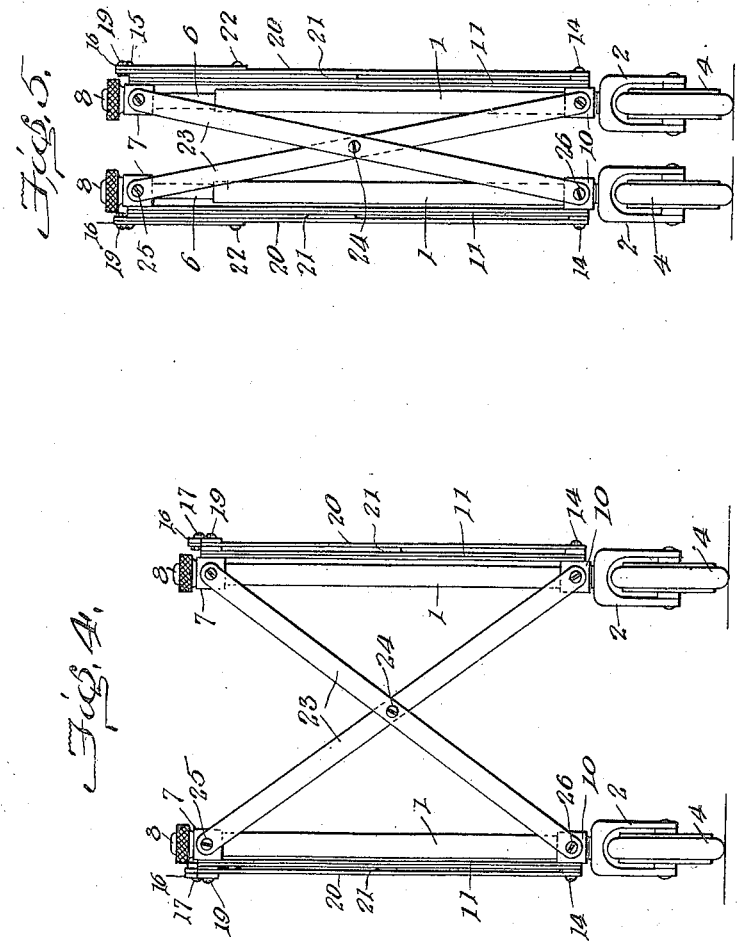
Witnesses
G. Howard Walmsley,
Harriet Hammaker.
Inventor
William U. Colthar,
By H. A. Toulmin,
Attorney

UNITED STATES PATENT OFFICE.

WILLIAM U. COLTHAR, OF SPRINGFIELD, OHIO, ASSIGNOR TO THE CHAMPION CHEMICAL COMPANY, OF SPRINGFIELD, OHIO, A CORPORATION OF OHIO.

TRUCK FOR UNDERTAKERS' USE.

No. 875,049.

Specification of Letters Patent.

Patented Dec. 31, 1907.

Application filed May 31, 1906. Serial No. 319,505.

*To all whom it may concern:*

Be it known that I, WILLIAM U. COLTHAR, a citizen of the United States, residing at Springfield, in the county of Clark and State of Ohio, have invented certain new and useful Improvements in Trucks for Undertakers' Use, of which the following is a specification, reference being had therein to the accompanying drawings.

This invention relates to improvements in trucks for undertakers' use.

The purpose of the invention is to provide a truck which will be foldable both lengthwise and sidewise, to utilize four independent corner posts, each composed of two members which telescope with each other, and to combine therewith lazy-tongs or intersecting bars both at the sides and the ends, the structure being devoid of cross bars between the pairs of posts at either end, which will prevent folding sidewise, and being devoid of links to connect the lazy-tongs bars with the posts, the connection between my lazy-tongs bars and the posts, both at the sides and ends of the truck, being direct, and the telescopic structure of the posts compensating for the elongation of the lazy-tongs frame at the ends and at the sides when the truck is subjected to the double folding.

In the accompanying drawings, Figure 1 is a side elevation of my improved casket truck in a distended state ready for use; Fig. 2, a similar view with the truck partly folded lengthwise, that is to say, folded to shorten its length; Fig. 3, a side elevation and partial section of one of the posts; Fig. 4, an end view of the truck in the same state as shown in Fig. 1; and Fig. 5, another end view of the truck, partly folded sidewise, that is to say, folded to lessen its width.

The numeral 1 designates the outer member of each of the four independent corner posts. Two of these posts have wheel yokes 2 and the other two have wheel yokes 3, the former yokes being rigid with respect to the posts, and the latter yokes being carried by a vertical pivot so that the yokes swivel after the fashion of a caster-wheel. In the yokes 2 are mounted wheels 4 and in the yokes 3 are mounted caster-wheels 5. But in cases where the truck will be utilized as a pedestal these yokes and wheels may be omitted, and the posts will stand directly upon the floor. But otherwise the structure will remain the same. So, in referring to the invention as a truck it will be understood to include a pedestal.

The members 1 of the posts being so composed of tubes are thereby adapted to contain the members 6 composed of rods mounted to readily slide up and down in the tubes. The rods have heads or blocks 7 with an ornamental top or capping 8. The blocks are square so as to afford flat surfaces upon which to fit the lazy-tongs or intersecting bars both at the sides and at the ends of the structure. The lower ends of the tubular members of the posts are also flattened, as shown by the block-like formation at 10, also for the purpose of affording flat surfaces against which to fit the bars.

It will now be understood that there are four independent posts, as seen by comparing Figs. 1 and 4. These posts are to be connected by foldable side frames and end frames composed of lazy-tongs bars having direct connection, both at the ends and sides, with the respective members of the posts. Referring to these side frames it will be seen that they are composed of a series of lazy-tongs or intersecting bars 11 having interconnecting pivots 12 where they intersect each other and other pivots 13 where their ends meet. The lower ends of the outer bars are pivoted by pivots 14 to the blocks 10 of the tubular members of the posts. The upper ends of the outer bars are pivoted by pivots 15 to the blocks 7 of the inner or sliding members of the posts.

To elongate the truck at its upper end I provide extensions composed of horizontal side bars 16 with a break-joint at 17 and a stop pin at 18 to limit the movement on the pivot 17 and keep the two branches of the bar 16 in line when these extensions are drawn out, as shown in Fig. 1. The inner ends of the horizontal bars 16 are carried by the pivots 15, while to their outer ends are pivoted at 19 brace bars 20 whose lower ends are supported on the pivots 14. To stiffen the extension when extended, and to draw the extension and hold it up to or near the posts when the extension is folded, I further provide supplemental brace bars 21 whose upper ends are carried on the pivots 15 and whose lower ends are connected by pivots 22 to the brace bars 20.

Viewing Fig. 1 it will be seen that the truck is in extended state and ready for use. Viewing Fig. 2 it will be seen that the truck is in a partially folded state lengthwise and that the sliding members 6 of the posts have moved upward to compensate for the lengthening of the lazy-tongs side frame, while the extensions are also in a folded state, the bars 16 being forced down and hinging on their break-joint 17, while the supplemental braces 21 have drawn the extensions inward and will draw them further inward as the further folding of the structure is proceeded with. It will be seen too that the pivots 15 carry an end bar of the side frame, carry the extension bars, and carry the supplemental braces, while the pivots 14 carry an end bar and the lower end of the main brace.

Referring now to Figs. 4 and 5 and to the end frames it will be seen that they are composed of a pair of lazy-tongs or intersecting bars 23 pivoted together at their intersection on a pivot 24 and connected at their upper ends by pivots 25 to the end faces of the blocks 7 on the members 6 of the posts and pivoted at their lower ends by pivots 26 to the end faces of the blocks 10 of the members 1 of the posts. Looking at Fig. 4 it will be seen that the truck stands at its full width, while from Fig. 5 it is seen that the truck is partly folded sidewise and that as a consequence the sliding members of the posts have moved to compensate for the lengthening of the end frames. The connection, it will be observed, between the end frames and the posts is direct, without the intervention of links and their additional joints.

It will thus be seen that in my truck (or pedestal) there are two particular qualities or features, namely, that the same is foldable lengthwise and foldable sidewise, and also that the connections between the posts and the side frames, and the posts and the end frames, are direct and devoid of intermediate links or other devices adding additional joints and pieces, and yet that this double folding is made possible by the elongation of the posts themselves to compensate for the lengthening of both the side and end frames when the structure is being folded.

In speaking of one member of each post sliding within the other it will be understood that this feature will find its equivalent in a structure in which the two members have a sliding relation whether one be within the other or not.

Having thus fully described my invention, what I claim as new and desire to secure by Letters Patent, is:—

1. In a device of the character described, four independent corner posts each composed of two members, one slidable within the other, side frames each composed of lazy-tongs bars, each frame pivoted at its upper and lower corners to the corresponding respective members of the posts, and extensions, one at either end of the device, each composed of an extension bar, a brace pivoted to said extension bar and to one member of the adjacent post, and a supplemental brace pivoted to the other member of said post and to said brace, substantially as described.

2. In a device of the character described, four independent posts, each composed of two members, one slidable within the other, two side frames composed each of intersecting bars, with the lower end of the outer bars pivoted to one member of the adjacent post and the upper end of the outer bars pivoted to the other member of the adjacent post, and end frames composed each of intersecting bars with the lower end of each bar pivoted to one member of the adjacnt post and the upper end of each bar pivoted to the other member of the adjacent post.

In testimony whereof, I affix my signature in presence of two witnesses.

WILLIAM U. COLTHAR.

Witnesses:
E. O. HAGAN,
HARRIET L. HAMMAKER.